(12) United States Patent
Welch

(10) Patent No.: US 10,099,780 B2
(45) Date of Patent: Oct. 16, 2018

(54) ACTIVE VIBRATION CONTROL ACTUATOR

(71) Applicant: Sikorsky Aircraft Corporation, Stratford, CT (US)

(72) Inventor: William A. Welch, North Haven, CT (US)

(73) Assignee: SIKORSKY AIRCRAFT CORPORATION, Stratford, CT (US)

(*) Notice: Subject to any disclaimer, the term of this patent is extended or adjusted under 35 U.S.C. 154(b) by 1153 days.

(21) Appl. No.: 14/047,182

(22) Filed: Oct. 7, 2013

(65) Prior Publication Data
US 2015/0097072 A1    Apr. 9, 2015

(51) Int. Cl.
*B64C 27/00*    (2006.01)

(52) U.S. Cl.
CPC ...... *B64C 27/001* (2013.01); *B64C 2027/004* (2013.01)

(58) Field of Classification Search
CPC ............ B64C 27/001; B64C 2027/002; B64C 2027/004; F16F 7/10
USPC ....................................... 188/378; 244/17.11
See application file for complete search history.

(56) References Cited

U.S. PATENT DOCUMENTS

| | | | | |
|---|---|---|---|---|
| 2,941,845 A * | 6/1960 | Osborne | ................. | B64C 25/46 137/48 |
| 3,077,324 A * | 2/1963 | Strickland, Jr. | ..... | B60R 22/4633 137/355.2 |
| 3,219,120 A * | 11/1965 | Hooper | ................. | B64C 27/001 188/378 |
| 3,292,977 A * | 12/1966 | Williams | ................ | B64C 25/46 137/39 |
| 3,871,788 A | 3/1975 | Barsby | | |
| 4,241,615 A * | 12/1980 | Ryan | ....................... | B06B 1/167 172/40 |
| 4,819,182 A * | 4/1989 | King | ..................... | B64C 27/001 244/17.11 |
| 4,892,273 A * | 1/1990 | Fedor | ................... | G05D 1/0883 244/165 |
| 4,955,556 A * | 9/1990 | Frisk | ....................... | B60R 22/38 242/382 |
| 5,005,439 A * | 4/1991 | Jensen | .................... | F16F 15/22 248/550 |
| 5,150,875 A | 9/1992 | Holloway, III et al. | | |

(Continued)

OTHER PUBLICATIONS

Notification of Transmittal of the International Search Report of the International Searching Authority, or the Declaration; PCT/US2014/059025; dated Jan. 7, 2015; 8 Pages.

(Continued)

*Primary Examiner* — Philip J Bonzell
*Assistant Examiner* — Michael A. Fabula
(74) *Attorney, Agent, or Firm* — Cantor Colburn LLP

(57) ABSTRACT

A vibration control actuator includes a housing having a length between ends and a rotatable shaft located in the housing and extending along a housing length and which rotates about a shaft axis substantially parallel to the length. An inertia wheel assembly is operably connected to the rotatable shaft and configured to rotate therewith about the shaft axis. The inertia wheel assembly is in frictional contact with an inner wall of the housing and translatable to travel within the housing between the ends along at least a portion of the shaft axis.

21 Claims, 7 Drawing Sheets

(56) References Cited

U.S. PATENT DOCUMENTS

| | | | |
|---|---|---|---|
| 5,231,336 A * | 7/1993 | van Namen | F16F 7/1011 310/12.01 |
| 5,347,884 A | 9/1994 | Garnjost et al. | |
| 5,620,068 A | 4/1997 | Garnjost et al. | |
| 5,682,069 A * | 10/1997 | Phillips | F16F 15/03 310/51 |
| 5,718,418 A * | 2/1998 | Gugsch | H02K 33/16 188/267 |
| 5,833,567 A * | 11/1998 | Fernandez | F16H 33/185 192/45.002 |
| 5,853,144 A * | 12/1998 | Vincent | B64C 27/001 244/17.13 |
| 5,903,077 A * | 5/1999 | Garnjost | B06B 1/166 310/51 |
| 6,009,985 A * | 1/2000 | Ivers | F16F 7/1005 188/380 |
| 6,105,943 A * | 8/2000 | Nagasawa | F16F 13/264 267/140.14 |
| 6,869,375 B2 * | 3/2005 | Welsh | B64C 27/001 244/17.27 |
| 6,948,611 B2 | 9/2005 | Dumbaugh | |
| 7,448,854 B2 * | 11/2008 | Jolly | B64C 27/001 415/119 |
| 7,722,322 B2 * | 5/2010 | Altieri | G01M 1/22 415/119 |
| 7,958,801 B2 * | 6/2011 | Frederickson | B06B 1/16 209/367 |
| 8,313,296 B2 | 11/2012 | Jolly et al. | |
| 8,639,399 B2 * | 1/2014 | Jolly | B64C 27/001 701/3 |
| 2005/0075210 A1 * | 4/2005 | Frederickson | B06B 1/16 475/346 |
| 2005/0079056 A1 * | 4/2005 | Welsh | B64C 27/001 416/145 |
| 2009/0078519 A1 * | 3/2009 | Carcaterra | F16F 7/10 188/379 |
| 2009/0236468 A1 * | 9/2009 | Welsh | B64C 27/001 244/17.13 |
| 2011/0037260 A1 * | 2/2011 | Sadarnac | H02J 7/32 290/7 |
| 2012/0181377 A1 * | 7/2012 | Eller | B64C 27/001 244/17.11 |
| 2013/0203541 A1 * | 8/2013 | Lorenz | F16F 15/1478 475/59 |
| 2014/0231197 A1 * | 8/2014 | Watanabe | F16F 9/12 188/290 |
| 2015/0034350 A1 * | 2/2015 | Yun | B25B 21/00 173/178 |
| 2015/0060595 A1 * | 3/2015 | Plummer | B64C 27/001 244/17.11 |

OTHER PUBLICATIONS

Written Opinion of the International Searching Authority; PCT/US2014/059025; dated Jan. 7, 2015; 4 Pages.

* cited by examiner

ACTIVE VIBRATION CONTROL ACTUATOR

BACKGROUND

The subject matter disclosed herein relates to the art of rotary wing aircraft and, more specifically to active vibration control or suppression in a rotary wing aircraft.

Rotary wing aircraft, or rotorcraft, can generate significant vibratory responses during operation. The primary source of such vibration is that generated by the main rotor system rotating at the blade passing frequency. Forces and moments are transmitted through the gearbox into the airframe, resulting in airframe vibration. One approach to counteracting such vibration involves replacing a rigid gearbox mounting strut with a compliant strut and parallel hydraulic actuator. A control computer commands the actuator such that the gearbox is selectively vibrated to produce inertial forces which minimize airframe vibrations. Although effective, this approach is inadequate in certain situations, such as a vehicle having a gearbox secured directly to the airframe, without mounting struts.

Another approach utilizes a first pair of counter-rotating eccentric masses that rotate at the frequency of the primary aircraft vibration and generate a fixed magnitude vibration force. The fixed magnitude force is then paired with a constant magnitude load from a second pair of counter-rotating masses to produce a resultant vibratory force of variable magnitude and phase. This method is heavy as it requires multiple eccentric masses powered by multiple motors and often these must be enclosed in separate housings to allow for geometric alignments that minimize unwanted moments and are thus not amenable to weight reductions. A typical approach to reduce weight in such a system would be to reduce the weight of the masses, and increasing the radius of their rotation to compensate for the reduced mass. However, since the system is circular in configuration, weight of housing components increases with radius squared, this negating the desired weight reduction. Additionally aircraft sometimes experience multiple frequencies of ambient vibration caused by forward flight load on the rotor systems. The counter-rotating eccentric mass type actuator is only suitable for generating one frequency of anti-vibration load as the load frequency is determined by the rotational speed of the eccentric masses. This is undesirable as it requires multiple such anti-vibration actuators to suppress multiple frequencies of ambient vibration.

Yet another method excites a mass-spring pair that is tuned to be nearly resonant at the desired operating frequency. In this case, linear motion of the mass is limited by material stresses of the spring. Thus, increased motion requires that larger and heavier springs be utilized.

BRIEF DESCRIPTION

In one embodiment, a vibration control actuator includes a housing having a length between ends and a rotatable shaft located in the housing and extending along a housing length and which rotates about a shaft axis substantially parallel to the length. An inertia wheel assembly is operably connected to the rotatable shaft and configured to rotate therewith about the shaft axis. The inertia wheel assembly is in frictional contact with an inner wall of the housing and translatable to travel within the housing between the ends along at least a portion of the shaft axis.

In another embodiment, a rotary-winged aircraft includes an airframe, a drive system and a rotor assembly operably connected to the drive system. A vibration control actuator is located in the airframe to counteract airframe vibration. The vibration control actuator includes a housing having a length between ends and a rotatable shaft located in the housing and extending along a housing length and which rotates about a shaft axis substantially parallel to the length. An inertia wheel assembly is operably connected to the rotatable shaft and configured to rotate therewith about the shaft axis. The inertia wheel assembly is in frictional contact with an inner wall of the housing and translatable to travel within the housing between the ends along at least a portion of the shaft axis.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
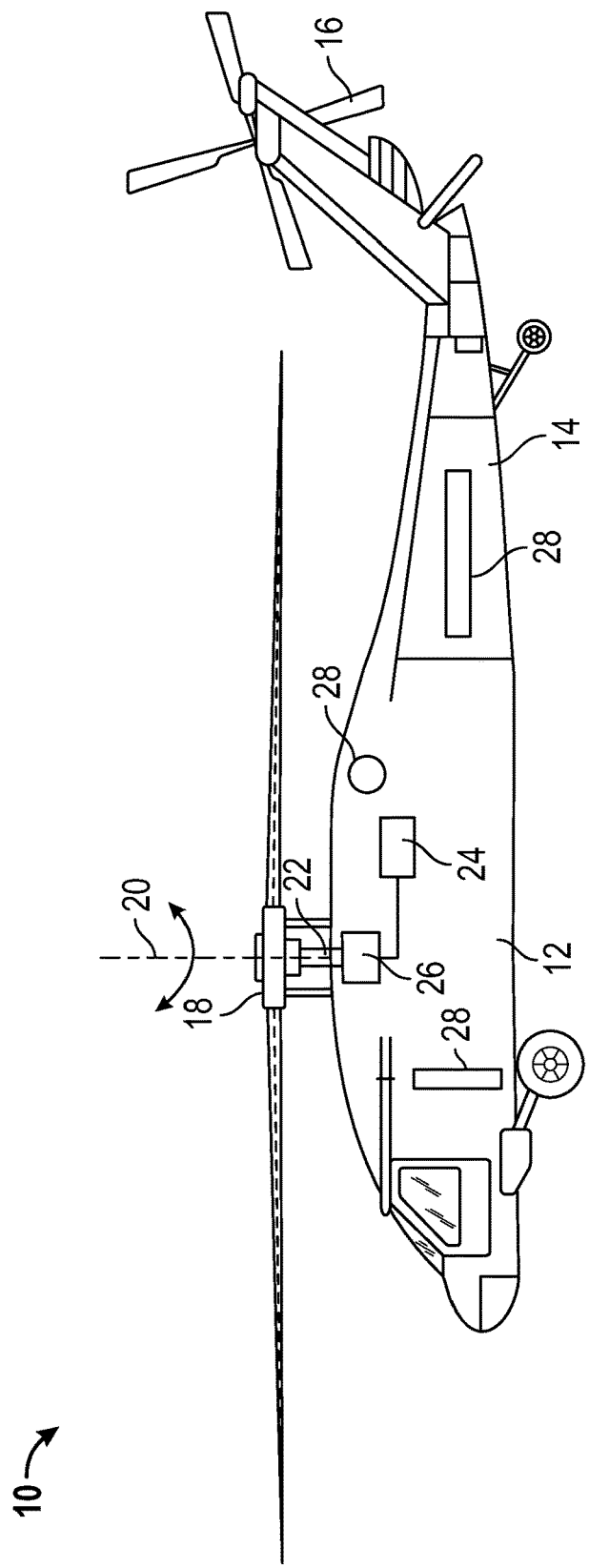
FIG. 1 is a schematic view of an embodiment of a helicopter.

Shown in FIG. 1 is schematic view of an embodiment of an aircraft, in this embodiment a helicopter 10. The helicopter 10 includes an airframe 12 with an extending tail 14 and a tail rotor 16 located thereat. While the embodiment of a helicopter 10 described herein includes an extending tail 14 and tail rotor 16, it is to be appreciated that the disclosure herein may be applied to other types of rotor craft as well as helicopters 10 of other configurations. A main rotor assembly 18 is located at the airframe 12 and rotates about a main rotor axis 20. The main rotor assembly 18 is driven by a drive shaft 22 connected to a power source, for example, an engine 24 by a gearbox 26. To suppress vibration of the airframe 12 resulting from, for example, rotation of the main rotor assembly 18 about the main rotor axis 20, a number of active vibration control (AVC) actuators 28 are located in the airframe 12. In some embodiments, 3-6 AVC actuators 28 are utilized, although the number is not specifically limited. While shown in the context of a single rotor configuration, it is understood that aspects could be used on coaxial rotorcraft such as the X2® helicopter. Further, while shown attached to the airframe 12, the location of the actuators 28 is not limited thereto and not all actuators 28 need to be collocated in a common area. Lastly, the AVC actuator 28 can be a self-contained unit, as in a line replaceable unit, or can be directly incorporated into the design of the aircraft as needed.

Figure 2:
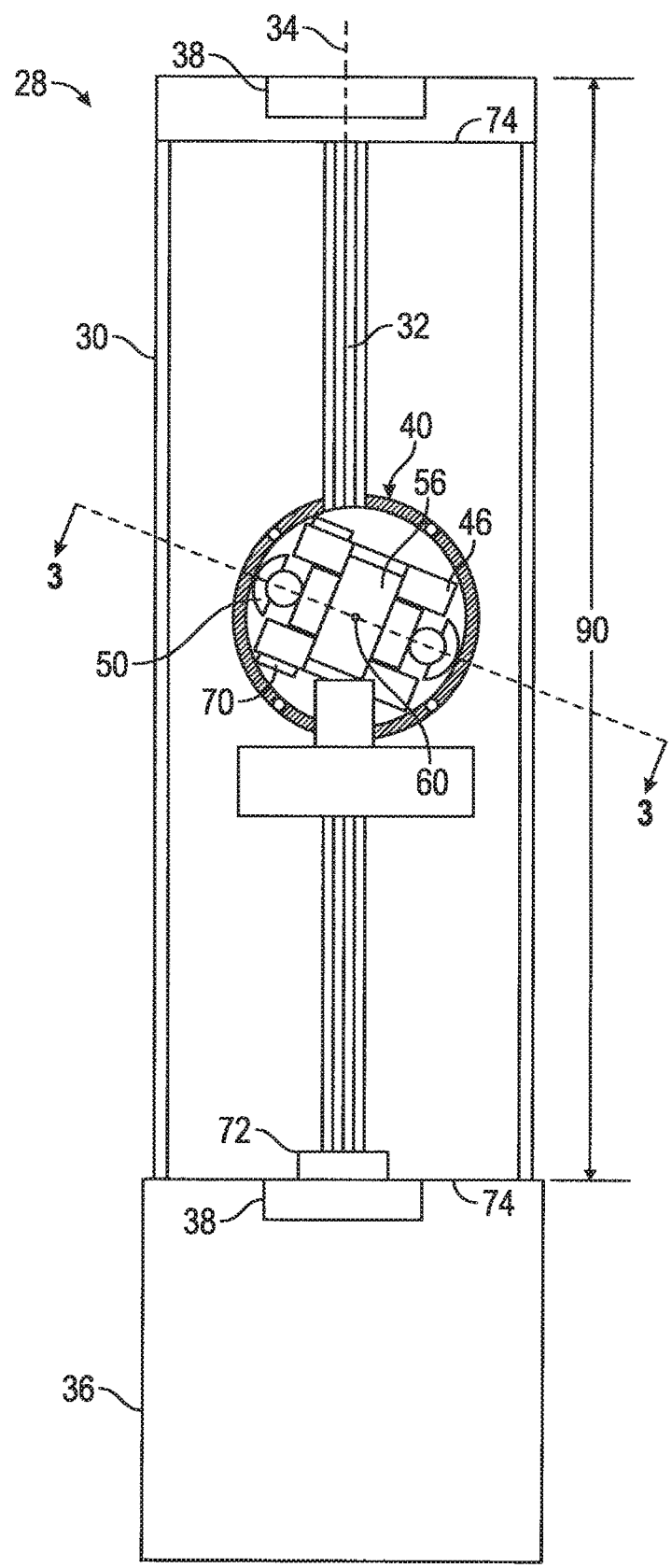
FIG. 2 is a side view of an embodiment of an active vibration control actuator.

Shown in FIG. 2 is a side view of an embodiment of an AVC actuator 28. The AVC actuator 28 includes an elongated cylindrical housing 30, and a rotatable shaft 32 located inside the housing 30 and extending along a housing length 90. The shaft 32 rotates about a shaft axis 34, and is driven by a shaft drive 36, for example, an electric motor, hydraulic actuator, or a gear mechanism operably connected to the gearbox 26. In some embodiments, the shaft drive 36 rotates the shaft 32 at between about 10000 and 20000 RPM. The electric motor, hydraulic actuator speed and torque can be modified by a local gearbox as part of assembly 36. The shaft 32 is supported in the housing 30 by shaft bearings 38. The shaft 32 is linked to an inertia wheel assembly 40, such that rotation of the shaft 32 drives rotation of the inertia wheel assembly 40 about the shaft axis 34.

Figure 3:
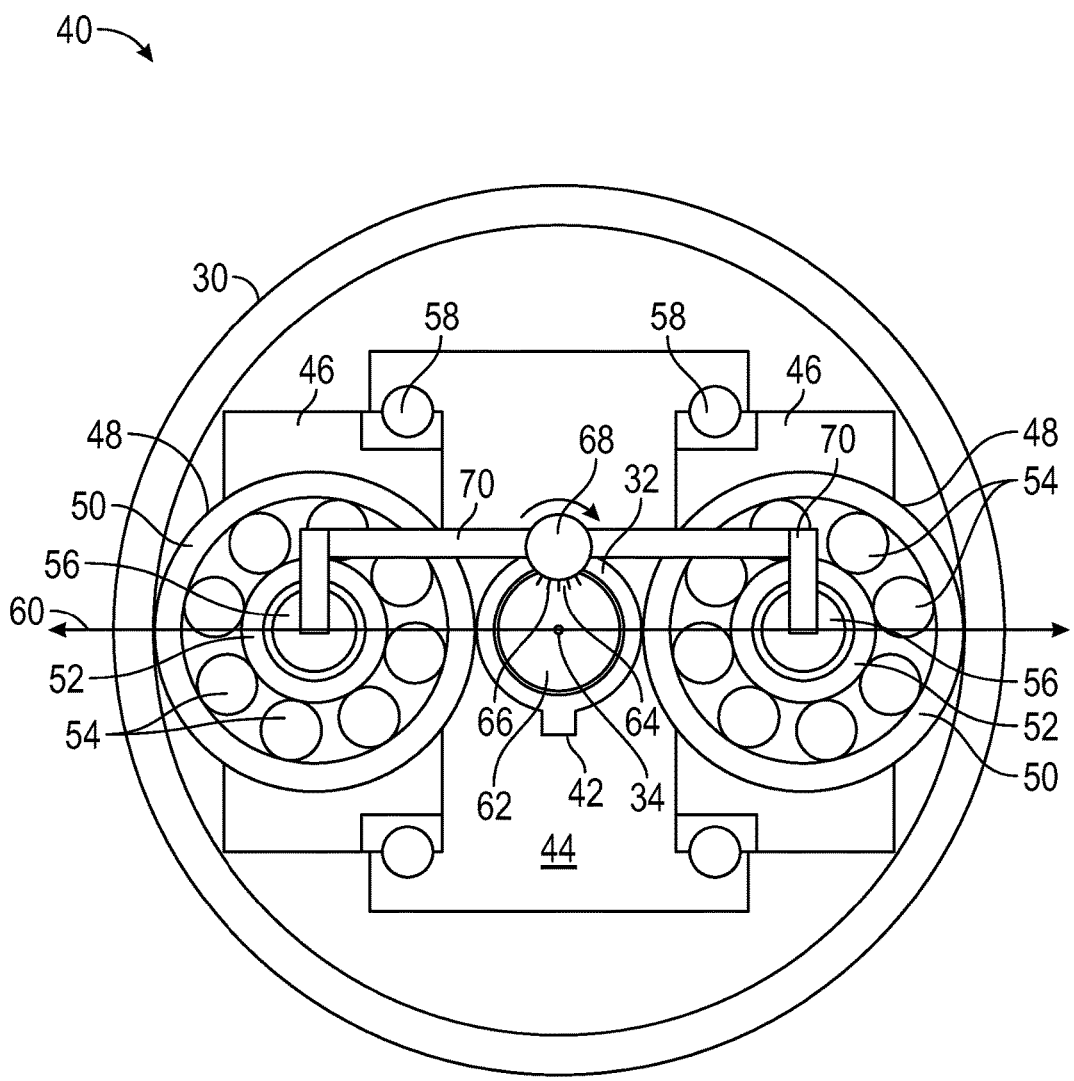
FIG. 3 is a cross-sectional end view of an embodiment of an active vibration control actuator.

Referring now to the end view of FIG. 3, the inertia wheel assembly 40 will be described in more detail. Shaft 32 is connected to inertia wheel assembly 40 via spline connection 42, specifically located to connect shaft 32 to hub 44. Hub 44 is located at shaft axis 34 and retains a selected number of wheel holders 46 therein, each wheel holder 46 in turn containing an inertia wheel 48. Although two inertia wheels 48 are shown in FIG. 3, it is to be appreciated that other quantities of inertia wheels 48 may be utilized. The inertia wheel 48 includes an outer rim 50, and an inner rim 52 with a plurality of rollers 54 between the inner rim 52 and the outer rim 50. An axle 56 supports the inertia wheel 48 at the inner rim 52, and the inertia wheel 48 is rotatable about the axle 56. Wheel holders 46 are supported at hub 44 by bearings 58, which allow the wheel holders 46 to rotate about axis 60.

Driven by rotation of the shaft 32, the inertia wheels 48 are pushed outwardly by centrifugal forces against the housing 30. The resulting load between the inertia wheels 48 and the housing 30 acts frictionally to keep the inertia wheels 48 from slipping relative to the housing 30. Thus, the outer rim 50 of the inertia wheel 48 rotates about the axle 56. The outer rim 50 and the wheel holders 46 are relatively massive as compared to the other rotating components in the inertia wheel assembly 40 and the clearances in bearings 58 are designed such that the centrifugal load is transferred directly into the housing 30, rather than into the rollers 54 thus reducing wear on the rollers 54. Additionally, a compliant surface or other surface treatment to an inner wall of the housing 30 and/or the outer surface of the outer rim 50 can be utilized to enhance the friction between the housing 30 and the outer rim 50.

Figure 4:
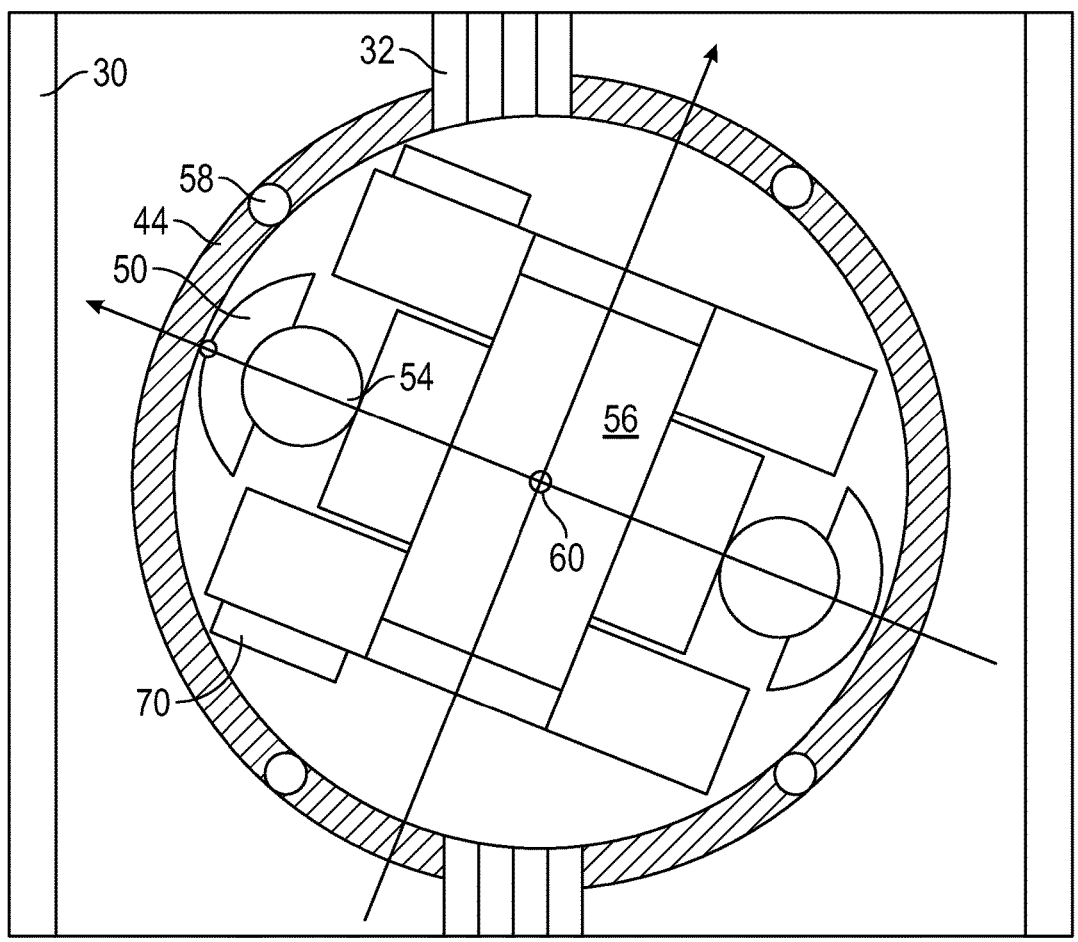
FIG. 4 is partial side view of an embodiment of an active vibration control actuator.

The inertia wheel assembly 40 is driven to travel along the housing length 90. This drive is accomplished by a steering assembly connected to the inertia wheel assembly 40. The steering assembly includes a steering shaft 62 located inside the shaft 32. The steering shaft 62 rotates about the shaft axis 34, but oscillates at an oscillation angle relative to the shaft 32. In some embodiments, the oscillation angle is between about +/−15 degrees relative to the shaft 32. The steering shaft 62 includes shaft teeth 64 that mesh with gear teeth 66 of a steering gear 68. The steering gear 68 is connected to steering links 70 connected to the inertia wheels 48 at, for example, axles 56. The oscillation of the steering shaft 62 causes similar oscillation of the steering gear 68, which is transmitted to the inertia wheels 48 via the steering links 70. Typically the oscillation will be a combination of sinusoidal motions of different frequencies that represent the predominant response vibration frequencies of the aircraft. The oscillation urges a yaw motion in the inertia wheels 48 about axes 60, and drives them along the housing length 90, as shown in FIG. 4. Bearing 58 guides ensures pure pitching motion 60 of pitching blocks 46 and inertia wheels 48. Axles 56 are retained by pitching blocks 46.

Referring again to FIG. 2, when the inertia wheel assembly 40 reaches an end of the housing 30, the magnitude of the inertia wheel pitch angle is reduced, thereby reducing the longitudinal speed of the inertia wheel assembly 40 along the housing length 90. The reduction in longitudinal speed results in a torque that is applied to the drive motor tending to increase its speed. However, the motor speed is optionally constant thus the torque may be used to convert the kinetic energy of the inertia wheel assembly 40 into electrical energy. Finally, once the end of the housing length 90 is reached, the magnitude of the steering angle is increased again to drive the inertia wheel assembly in the opposite direction along the housing length 90. In some embodiments, a spring 72, either a physical spring or pneumatic spring, is located at each housing end 74 to assist redirection of the inertia wheel assembly 40. The longitudinal inertial load of the inertia wheel assembly 40 results in inertial loads, which may be tuned in magnitude and phase to offset or cancel airframe vibrations.

Figure 5:
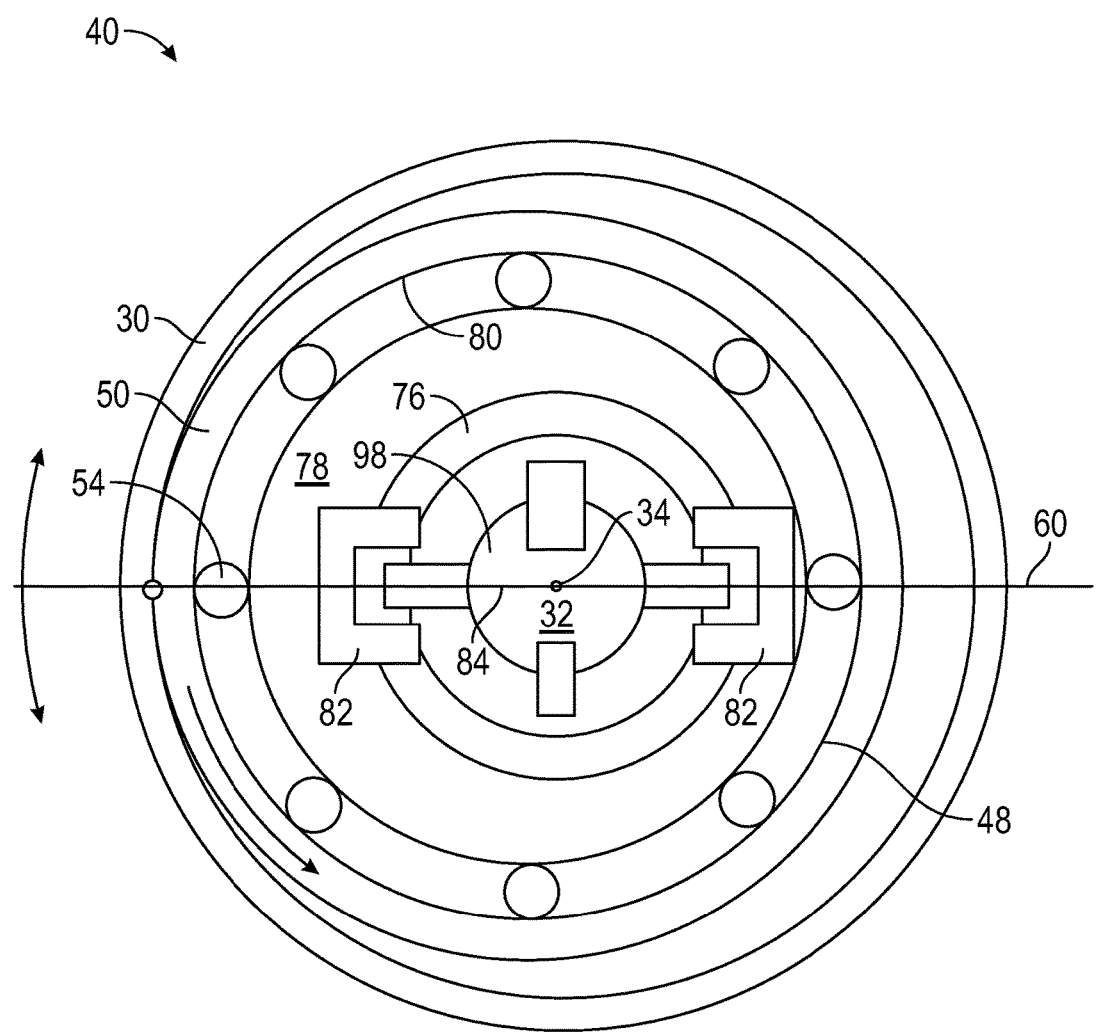
FIG. 5 is a cross-sectional end view of another embodiment of an active vibration control actuator.
Figure 6:
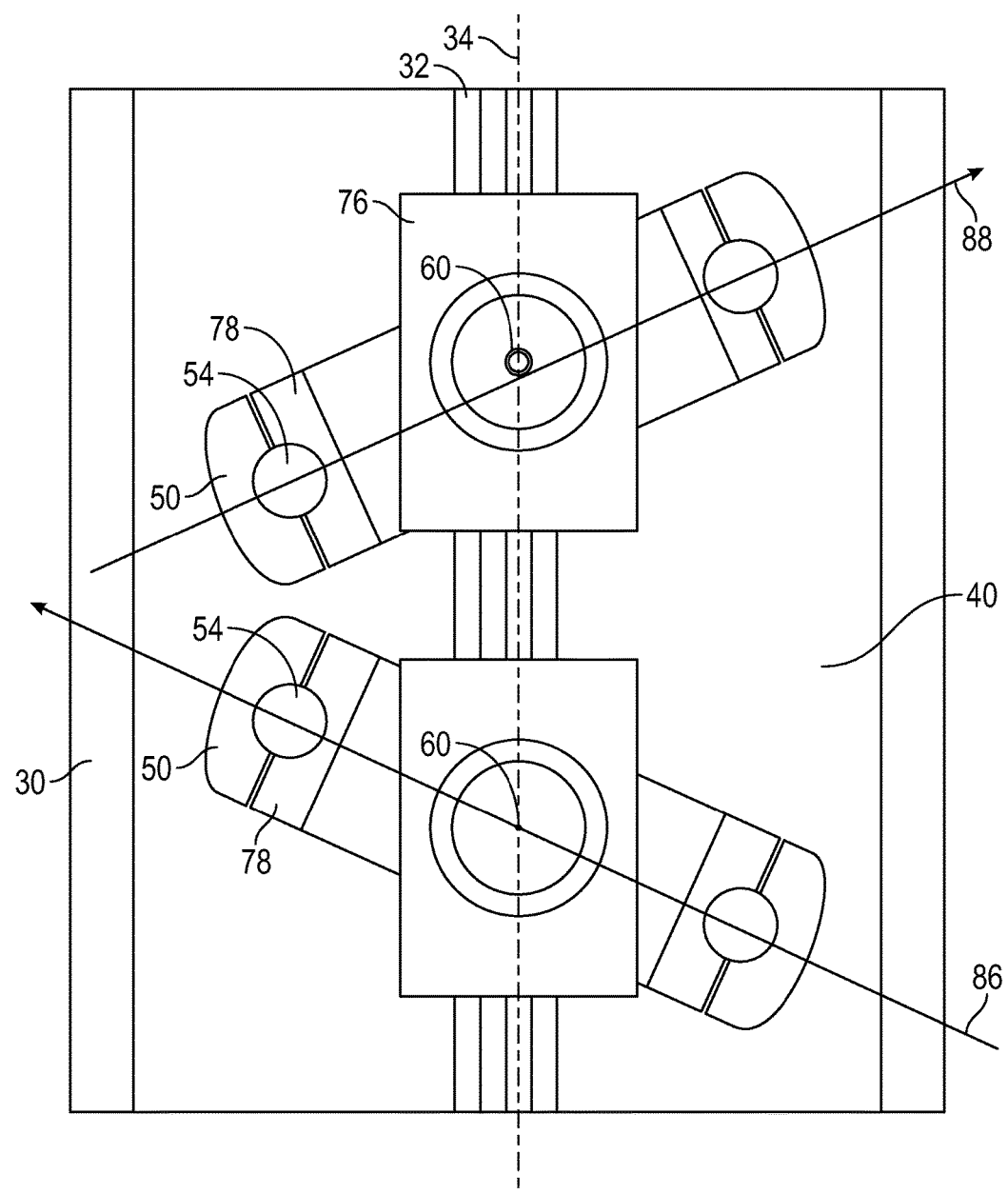
FIG. 6 is a partial side view of an embodiment of an active vibration control actuator.

Another embodiment is illustrated in FIGS. 5 and 6. Referring now to FIG. 5, the inertia wheel assembly 40 includes a single inertia wheel 48. In this embodiment, collar 76 is connected to the shaft 32 via a spline connection 98, allowing the collar 76 to slide along the length 90. The collar 76 is connected to an intermediate ring 78 having an eccentric perimeter 80. The collar 76 is connected to the intermediate ring 78 via a bearing 82 allowing pitch of the intermediate ring 78 about axis 60, as best shown in FIG. 6. Referring again to FIG. 5, the rollers 54 are positioned between the intermediate ring 78 and the outer rim 50. Because the intermediate ring 78 has a center point 84 offset from the shaft axis 34, as the shaft 32 is rotated, the center point 84 traces a circular path around the shaft axis 34, the outer rim 50 thus walking along the inner wall of the housing 30 resulting in an unbalanced radial load, as the rim 50 traverses the inner wall of the housing 30 and translates along the length 90.

Figure 7:
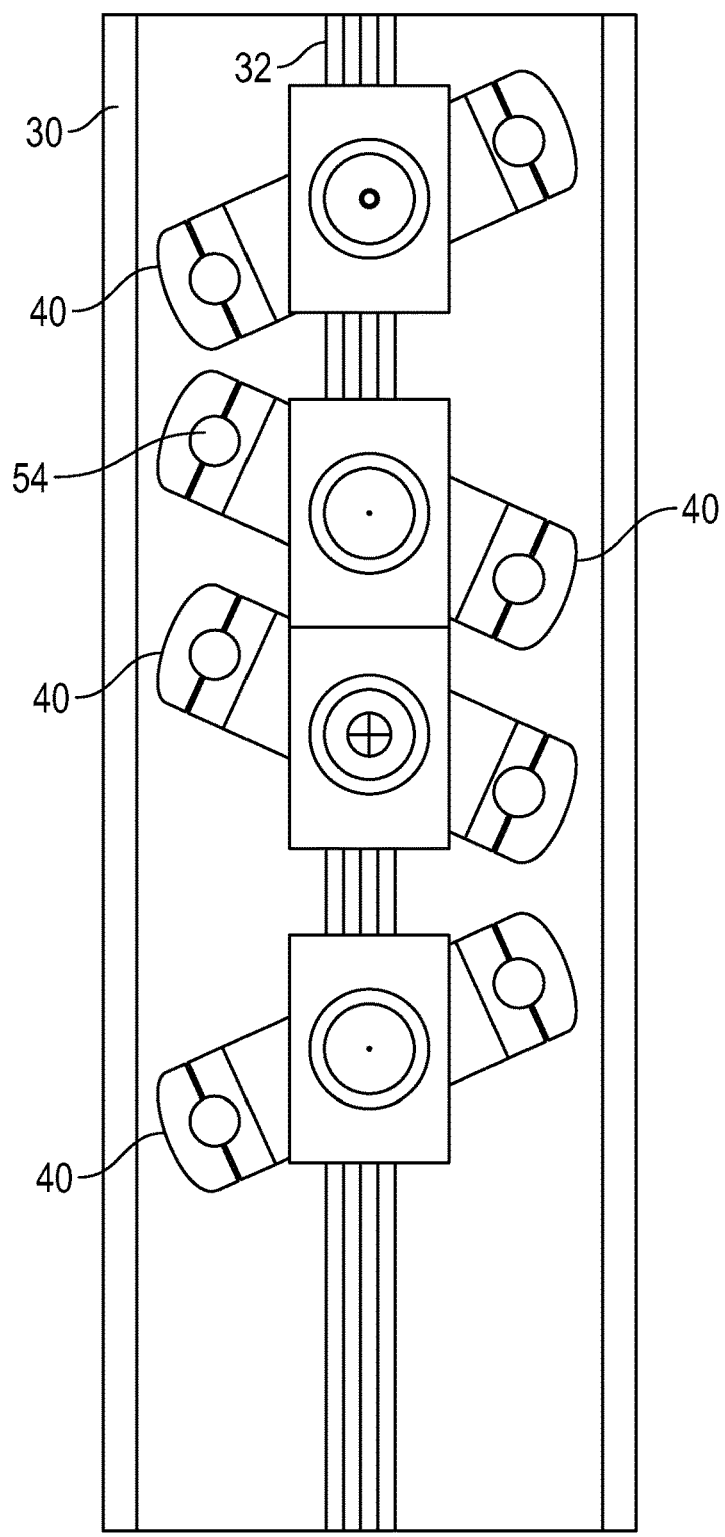
FIG. 7 is a partial side view of yet another embodiment of an active vibration control actuator.

In some cases it may be desirable to balance the radial load. To accomplish this multiple inertia wheel assemblies 40 can be utilized as shown in FIG. 6. In the embodiment of FIG. 6, two opposing inertia wheel assemblies 40 are used to cancel the radial loads. In the time instance shown, inertial wheel 40a is contacting the cylinder 30 at point 60a whereas inertia wheel 40b is contacting the cylinder 30 at point 60b which is 180 degrees from wheel 40a. A lateral load is produced at point 60a and an additional lateral load but in the opposite direction is produced at point 60b. The result is a balance in lateral load but also results in an unwanted moment depicted by 86. To counterbalance unwanted moment 86, an additional two inertia wheel assemblies 40 are used as shown in FIG. 7. As such, aspects of the invention allow variations in numbers of the inertia wheel assemblies 40 depending on the particular circumstance of a design.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. For instance, aspects can be used with propeller assemblies and/or fans where blade pitch control and compactness of design may be useful, and can be used in other contexts where control of vibration is important such as in semiconductor manufacturing and precision engineering. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A vibration control actuator comprising:
   a housing having a length between ends;
   a rotatable shaft disposed in the housing and extending along a housing length and which rotates about a shaft axis substantially parallel to the length; and
   an inertia wheel assembly operably connected to the rotatable shaft and configured to rotate therewith about the shaft axis, the inertia wheel assembly being in frictional contact with an inner wall of the housing and translatable to travel within the housing between the ends along at least a portion of the shaft axis.

2. The vibration control actuator of claim 1, wherein the inertia wheel assembly comprises:
   a hub operably connected to the rotatable shaft;
   an inertia wheel secured to the hub and including:
   an axle;
   an outer rim in contact with the inner wall of the housing; and
   a plurality of rollers disposed between the axle and the outer rim;
   wherein the inertia wheel is rotatable about a pitch axis substantially perpendicular to the shaft axis.

3. The vibration control actuator of claim 2, wherein the inertia wheel assembly is configured such that rotating the inertia wheel about the pitch axis urges changes in the translation motion of the inertia wheel along the shaft axis.

4. The vibration control actuator of claim 2, further comprising a steering system to control the rotation of the inertia wheel about the pitch axis.

5. The vibration control actuator of claim 4, wherein the steering system includes:
   a steering shaft disposed in the rotatable shaft, the steering shaft oscillating relative to rotation of the rotatable shaft about the shaft axis;
   a steering gear meshed with the steering shaft; and
   a steering link operably connecting the steering gear to the inertia wheel;
   wherein rotation of the steering shaft relative to the rotatable shaft urges rotation of the inertia wheel about the pitch axis.

6. The vibration control actuator of claim 2, wherein the inertia wheel assembly includes an additional inertia wheel secured to the hub such that the inertia wheel and the additional inertia wheel are separated by the shaft axis.

7. The vibration control actuator of claim 2, wherein the outer rim surrounds the rotatable shaft.

8. The vibration control actuator of claim 7, further comprising an eccentric intermediate ring disposed radially inboard of the outer rim, the plurality of rollers disposed between the intermediate ring and the outer rim.

9. The vibration control actuator of claim 7, wherein the inertia wheel assembly includes an additional inertia wheel secured to the hub and spaced along the rotatable shaft relative to the inertia wheel.

10. The vibration control actuator of claim 9, wherein the inertia wheel assembly includes an additional pair of inertia wheels secured to the hub and spaced along the rotatable shaft.

11. A rotary-winged aircraft comprising:
    an airframe;
    a drive system;
    a rotor assembly operably connected to the drive system; and
    a vibration control actuator disposed in the airframe to counteract airframe vibration including:
    a housing having a length between ends;
    a rotatable shaft disposed in the housing and extending along a housing length and which rotates about a shaft axis substantially parallel to the length; and
    an inertia wheel assembly operably connected to the rotatable shaft and configured to rotate therewith about the shaft axis, the inertia wheel assembly being in frictional contact with an inner wall of the housing and translatable to travel within the housing between the ends along at least a portion of the shaft axis.

12. The aircraft of claim 11, wherein the inertia wheel assembly comprises:
    a hub operably connected to the rotatable shaft;
    an inertia wheel secured to the hub and including:
    an axle;
    an outer rim in contact with the inner wall of the housing; and
    a plurality of rollers disposed between the axle and the outer rim;
    wherein the inertia wheel is rotatable about a pitch axis substantially perpendicular to the shaft axis.

13. The aircraft of claim 12, wherein the inertia wheel assembly is configured such that rotating the inertia wheel about the pitch axis urges changes in the translation motion of the inertia wheel along the shaft axis.

14. The aircraft of claim 12, further comprising a steering system to control the rotation of the inertia wheel about the pitch axis.

15. The aircraft of claim 14, wherein the steering system includes:
    a steering shaft disposed in the rotatable shaft, the steering shaft oscillating relative to rotation of the rotatable shaft about the shaft axis;
    a steering gear meshed with the steering shaft; and
    a steering link operably connecting the steering gear to the inertia wheel;
    wherein rotation of the steering shaft relative to the rotatable shaft urges rotation of the inertia wheel about the pitch axis.

16. The aircraft of claim 12, wherein the inertia wheel assembly includes an additional inertia wheel secured to the hub such that the inertia wheel and the additional inertia wheel are separated by the shaft axis.

17. The aircraft of claim 12, wherein the outer rim surrounds the rotatable shaft.

18. The aircraft of claim 17, further comprising an eccentric intermediate ring disposed radially inboard of the outer rim, the plurality of rollers disposed between the intermediate ring and the outer rim.

19. The aircraft of claim 17, wherein the inertia wheel assembly includes an additional inertia wheel secured to the hub and spaced along the rotatable shaft relative to the inertia wheel.

20. The aircraft of claim 19, wherein the inertia wheel assembly includes an additional pair of inertia wheels secured to the hub and spaced along the rotatable shaft.

21. A vibration control actuator comprising:
a housing;
a rotatable shaft disposed in the housing and extending along a length of the housing and which is rotatable about a shaft axis substantially parallel to the length; and
an inertia wheel assembly operably connected to the rotatable shaft and configured to rotate therewith about the shaft axis,
the inertia wheel assembly contactable with an inner wall of the housing and translatable to travel within the housing and between ends thereof along a portion of the shaft axis, the inertia wheel assembly comprising a hub operably connected to the rotatable shaft and an inertia wheel secured to the hub and rotatable about a pitch axis transverse to the shaft axis such that inertia wheel rotation urges translation of the inertia wheel along the shaft axis.

* * * * *

UNITED STATES PATENT AND TRADEMARK OFFICE
CERTIFICATE OF CORRECTION

| | | |
|---|---|---|
| PATENT NO. | : 10,099,780 B2 | Page 1 of 1 |
| APPLICATION NO. | : 14/047182 | |
| DATED | : October 16, 2018 | |
| INVENTOR(S) | : William A. Welsh | |

It is certified that error appears in the above-identified patent and that said Letters Patent is hereby corrected as shown below:

On the Title Page

(72) Inventor should read: William A. Welsh, North Haven, CT (US)

Signed and Sealed this
Seventh Day of May, 2019

Andrei Iancu
*Director of the United States Patent and Trademark Office*